3,037,974
AZO-DYESTUFFS INSOLUBLE IN WATER
Herbert Kracker, Fritz Bauer, and Werner Kirst, Offenbach (Main), Germany, assignors to Farbwerke Hoechst Aktiengesellschaft vormals Meister Lucius & Bruning, Frankfurt am Main, Germany, a corporation of Germany
No Drawing. Filed Feb. 17, 1959, Ser. No. 793,698
Claims priority, application Germany Feb. 21, 1958
1 Claim. (Cl. 260—160)

The present invention relates to new azo-dyestuffs insoluble in water and to a process for preparing the same; more particularly it relates to dyestuffs corresponding to the following general formula

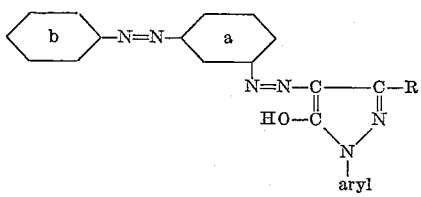

wherein the benzene nuclei $a$ and $b$ may contain as substituents halogen atoms, alkyl, alkoxy or nitro groups and R represents an alkyl or carboxylic acid ester group.

In U.S. patent application Serial No. 780,249, now abandoned, filed December 15, 1958 in the name of Herbert Kracker, Fritz Bauer, Werner Kirst and Walter Staab, there is disclosed a process for the manufacture of azo-dyestuffs insoluble in water, wherein the diazonium compound from a meta-amine-azo compound of the general formula

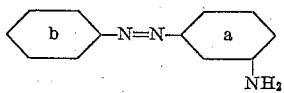

wherein the benzene nuclei $a$ and $b$ may be substituted by halogen atoms, alkyl, alkoxy or nitro groups, is coupled in substance, on the fiber or on another substratum with an arylamide of an aromatic or heterocyclic ortho-hydroxy-carboxylic acid or acyl-acetic acid free from groups imparting solubility in water.

These dyestuffs yield on fibers of aromatic polyesters particularly of polyethylene-terephthalates, valuable dyeings which are distinguished by good properties of fastness. The dyestuffs can also be produced on other synthetic fibers, such as acetyl-cellulose, triacetyl-cellulose or polyamide fibers, or on vegetable and also on animal fibers. Also on these fibers valuable dyeings are obtained.

The dyestuffs can also be prepared in substance or on a substratum, and they may be used for coloring plastic masses of high molecular weight or for the preparation of color lakes. Furthermore, they may be used for the manufacture of colored films by incorporating them in masses of cellulose esters or ethers, or they may be applied to textiles by the pigment printing process.

Now we have found that valuable azo-dyestuffs insoluble in water of similar good properties of fastness are obtained by using as coupling components instead of the said arylamides of aromatic or heterocyclic ortho-hydroxy-carboxylic acids or acylacetic acids 1-aryl-5-pyrazolones of the general formula

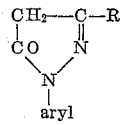

wherein R represents an alkyl or carboxylic acid ester group. As coupling components there may be used, for instance, the following compounds: 1-phenyl- or 1-naphthyl-3-alkyl-5-pyrazolones or 1-phenyl- or 1-naphthyl-5-pyrazolone-3-carboxylic acid alkyl esters containing further substituents in the phenyl or naphthyl radical, such as, for instance, one or more halogen atoms, alkyl, alkoxy or nitro groups. R may represent, for instance, a methyl group or a carbomethoxy radical.

The new dyestuffs so obtained yield on fibers of aromatic polyesters, particularly polyethylene-terephthalates, valuable yellow dyeings of good properties of fastness. The dyestuffs can also be produced on other synthetic fibers such as acetyl-cellulose, triacetyl-cellulose or polyamide fibers and also on vegetable or animal fibers. Also on these fibers valuable dyeings are obtained.

The dyestuffs can also be produced in substance or on a substratum or they can be used for coloring plastic masses of high molecular weight or for the preparation of color lakes. Furthermore, they may be applied to textiles by the pigment printing process.

The following examples serve to illustrate the invention but they are not intended to limit it thereto.

*Example 1*

1 kilogram of polyethylene-glycol-terephthalate silk is treated in a closed apparatus for 90 minutes at 120° C. in the following bath:

60 grams of 1-(2′,5′-dichlorophenyl)-3-methyl-5-pyrazolone and
6.2 grams of 3-amino-4′-methoxy-1.1′-azobenzene are dissolved at 90° C. in a mixture of
120 cc. of diacetone alcohol,
30 cc. of the sodium salt of sulfonated castor oil of 50% strength and
22.7 cc. of sodium hydroxide solution of 38° Bé. After the addition of
61 cc. of methoxybutylacetate, the solution is stirred into 20 liters of water at 90–95° C.

The materials is then rinsed and diazotized with 36 grams of sodium nitrite and 100 grams of sulfuric acid of 96% strength in 20 liters of water by introducing the material, heating the bath to 85° C. and treating the material for 30 minutes at this temperature. The material is then after-treated for 15 minutes at 80° C. in a solution containing per liter of water 4 cc. of sodium hydroxide solution of 38° Bé. and 2 grams of sodium dithionite to which a washing agent has been added, rinsed again and dried.

A yellow dyeing of very good properties of fastness is obtained.

*Example 2*

1 kilogram of combed material of polyethylene-glycol-terephthalate is treated for 90 minutes at 95–100° C. in the following bath:

22.4 grams of 1-(2′-naphthyl)-3-methyl-5-pyrazolone are dissolved in
9 cc. of sodium hydroxide solution of 38° Bé. and hot water. The solution is then made up to 20 liters with hot water at 90° C. To this bath are added
6.25 grams of 3-amino-4′-methoxy-1,1′-azobenzene,
40 grams of tetrahydronaphthalene previously dissolved in a hot mixture of 2.5 grams of a dispersing agent of the type of an alkyl-arylsulfonate,
2.5 grams of diglycol,
10 grams of butyl alcohol and
25 grams of methoxybutylacetate.

The material is then rinsed hot and cold and diazotized with 50 grams of sodium nitrite and 100 grams of sulfuric acid of 96% strength in 20 liters of water by introducing the material, heating the bath to 85° C. and treating the material for about 30 minutes at this temperature. The material is then rinsed, after-treated for 15 minutes at 80° C. in a solution containing per liter of water 4 cc. of sodium hydroxide solution of 38° Bé. and 2 grams of sodium dithionite to which a washing agent has been added, rinsed again and dried.

A yellow dyeing of very good properties of fastness is obtained.

*Example 3*

Cotton fabric is padded on the foulard at 95–100° C. with the following solution, squeezed out to 100% and dried:

11.4 grams of 1-(2'-naphthyl)-3-methyl-5-pyrazolone are dissolved with
30 cc. of the sodium salt of sulfonated castor oil of 50% strength and
12 cc. of sodium hydroxide solution of 38° Bé. and the solution is made up to 1 liter with water.

The dried fabric is developed with a diazo solution prepared by diazotizing 13.2 grams of 3-amino-4,6-dimethyl-4'-methoxy-1,1'-azobenzene with 4 grams of sodium nitrite and 15.6 cc. of hydrochloric acid of 20° Bé. and making up the solution to 1 liter with water. The material is squeezed off, and after a short air-passage it is after-treated at 80° C. in a solution containing per liter of water 5 grams of sodium acetate, rinsed, soaped at the boil, rinsed again and dried.

A golden yellow dyeing is obtained.

*Example 4*

1 kilogram of acetate rayon is treated for 90 minutes at 75–80° C. in the following bath:

7.6 grams of 1-phenyl-5-pyrazolone-3-carboxylic acid methylester and
2 grams of 3-amino-4'-methoxy-1,1'-azobenzene are dissolved in a hot mixture of
20 cc. of diacetone alcohol,
10 cc. of the sodium salt of sulfonated castor oil of 50% strength and
3.5 cc. of sodium hydroxide solution of 38° Bé. After the addition of
3 grams of methoxybutylacetate, the solution is made up to 3 liters with water at 70° C.

The material is then rinsed and diazotized for 45 minutes at 25° C. with 6 grams of sodium nitrite and 15 grams of sulfuric acid of 96% strength in 3 liters of water, rinsed, soaped for 15 minutes at 70° C. with a solution containing per liter of water 1 gram of a condensation product from an aminoalkylsulfonic acid and a fatty acid of high molecular weight and a small quantity of ammonia, rinsed again and dried.

A full yellow dyeing of good properties of fastness is obtained.

*Example 5*

1 kilogram of acetate rayon is treated for 90 minutes at 70–80° C. in the following bath:

2 grams of 3-amino-4,6-dimethyl-4'-methoxy-1,1'-azobenzene are dissolved in
5 cc. of diacetone alcohol and
2.5 cc. of the sodium salt of sulfonated castor oil of 50% strength and the solution is introduced into 3 liters of water at 70° C. containing 5 cc. of the sodium salt of sulfonated castor oil of 50% strength.

The material is then rinsed and diazotized for 30 minutes at 25° C. with 5.4 grams of sodium nitrite and 15 grams of sulfuric acid of 96% strength in 3 liters of water. The material is then rinsed and treated in a bath containing a solution of 10.4 grams of 1-phenyl-3-methyl-5-pyrazolone in 2.7 cc. of sodium hydroxide solution of 38° Bé. made up to 3 liters with water, and also 3 grams of monosodiumphosphate, by introducing the material, slowly heating the bath to 60° C., and treating the material for 30 minutes at this temperature. It is then rinsed and dried.

A clear yellow dyeing of good properties of fastness is obtained.

*Example 6*

25.7 grams of 3-amino-6,4'-dimethoxy-1,1'-azobenzene are diazotized in the usual manner. The diazo solution so obtained is run, while stirring well, into a suspension obtained by dissolving 22.4 grams of 1-(2'-naphthyl)-3-methyl-5-pyrazolone in denatured alcohol and dilute sodium hydroxide solution, and reprecipitating the compound with acetic acid. When the coupling is complete, the dyestuff obtained is filtered off with suction, washed and dried. It is a yellow powder. The coupling can also be carried out the the presence of a substratum adapted for the preparation of color lakes.

The following table indicates a number of further components which can be used in this invention, and also the tints of the azo-dyestuffs produced from the components on the fiber, which likewise possess good properties of fastness.

| Coupling Component | Diazo Component | Material to be dyed | Tint |
|---|---|---|---|
| 1-phenyl-3-methyl-5-pyrazolone. | 3-amino-4'-methoxy-1,1'-azobenzene. | polyethylene-glycolterephthalate fiber. | yellow. |
| Do | 3-amino-4-ethoxy-4'-methoxy-1,1'-azobenzene. | acetate rayon. | Do. |
| Do | 3-amino-6-ethoxy-4'-methoxy-1,1'-azobenzene. | do | golden yellow. |
| Do | 3-amino-3',4'-dimethoxy-1,1'-azobenzene. | do | yellow. |
| 1-phenyl-5-pyrazolone-3-carboxylic acid methyl ester. | do | do | Do. |
| Do | 3-amino-4,6-dimethyl-4' methoxy-1,1'-azobenzene. | do | Do. |
| Do | 3-amino-4,4'-dimethoxy-1,1'-azobenzene. | do | Do. |
| Do | 3-amino-4-ethoxy-4'-methoxy-1,1'-azobenzene. | do | Do. |
| 1-(2'-methylphenyl)-3-methyl-5-pyrazolone. | 3-amino-4,6-dimethyl-4'-methoxy-1,1'-azobenzene. | do | Do. |
| Do | 3-amino-4-ethoxy-4'-methoxy-1,1'-azobenzene. | do | Do. |
| Do | 3-amino-6-ethoxy-4'-methoxy-1,1'-azobenzene. | do | golden yellow. |
| Do | 3-amino-4,4'-dimethoxy-1,1'-azobenzene. | do | Do. |
| Do | 3-amino-3',4'-dimethoxy-1,1'-azobenzene. | do | yellow. |
| Do | 3-amino-4'-methoxy-1,1'-azobenzene. | polyethylene-glycolterephthalate fiber. | Do. |
| 1-(4'-methylphenyl)-3-methyl-5-pyrazolone. | do | do | Do. |
| Do | 3-amino-4-ethoxy-4'-methoxy-1,1'-azobenzene. | acetate rayon. | Do. |
| Do | 3-amino-4,4'-dimethoxy-1,1'-azobenzene. | do | Do. |
| Do | 3-amino-4,6-dimethyl-4'-methoxy-1,1'-azobenzene. | do | Do. |
| Do | 3-amino-3',4'-dimethoxy-1,1'-azobenzene. | do | Do. |

| Coupling Component | Diazo Component | Material to be dyed | Tint |
|---|---|---|---|
| 1-(2'-chlorophenyl)-3-methyl-5-pyrazolone. | 3-amino-4'-methoxy-1,1'-azobenzene. | polyethyleneglycol-terephthalate fiber. | Do. |
| 1-(2',5'-dichlorophenyl)-3-methyl-5-pyrazolone. | 3-amino-1,1'-azobenzene. | ___do___ | Do. |
| 1-(2'-naphthyl)-3-methyl-5-pyrazolone. | 3-amino-4'-ethoxy-1,1'-azobenzene. | ___do___ | Do. |
| 1-(3'-nitrophenyl)3-methyl-5-pyrazolone. | 3-amino-4'-methoxy-1,1'-azobenzene. | ___do___ | Do. |
| 1-(2'-naphthyl)-3-methyl-5-pyrazolone. | 3-amino-1,1'-azobenzene. | ___do___ | Do. |
| Do. | 3-amino-4,4'-dimethoxy-1,1'-azobenzene. | ___do___ | Do. |
| Do. | 3-amino-4-methyl-4'-methoxy-1,1'-azobenzene. | ___do___ | Do. |
| Do. | 3-amino-4-ethoxy-4'-methoxy-1,1'-azobenzene. | acetate rayon | reddish yellow. |
| Do. | 3-amino-3',4'-dimethoxy-1,1'-azobenzene. | ___do___ | yellow. |

We claim:

The water-insoluble azo-dyestuff corresponding to the following formula:

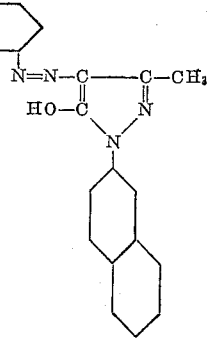

References Cited in the file of this patent

UNITED STATES PATENTS

| 2,437,645 | Long et al. | Mar. 9, 1948 |
| 2,779,758 | Neier et al. | Jan. 29, 1957 |
| 2,879,266 | Anderson | Mar. 25, 1959 |